United States Patent
Ziarnick et al.

(10) Patent No.: US 10,713,960 B1
(45) Date of Patent: Jul. 14, 2020

(54) PRESENTATION OF 2D AND 3D ASSISTED VISUAL SEPARATION INFORMATION

(71) Applicant: HONEYWELL INTERNATIONAL INC., Morris Plains, NJ (US)

(72) Inventors: Melissa Ziarnick, Montgomery, AL (US); Tomas Bouda, Brno (CZ); Ratan Khatwa, Sammamish, WA (US); Thea Feyereisen, Hudson, WI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/456,924

(22) Filed: Jun. 28, 2019

(51) Int. Cl.
*G08G 5/00* (2006.01)
*G08G 5/02* (2006.01)
*G06F 3/14* (2006.01)
*B64D 43/00* (2006.01)
*G09G 5/37* (2006.01)

(52) U.S. Cl.
CPC ............. *G08G 5/025* (2013.01); *B64D 43/00* (2013.01); *G06F 3/1423* (2013.01); *G09G 5/37* (2013.01); *G09G 2340/0464* (2013.01); *G09G 2380/12* (2013.01)

(58) Field of Classification Search
CPC .. G08G 5/025; G09G 5/37; G09G 2340/0464; G09G 2380/12; B64D 43/00; G06F 3/1423
USPC ............ 340/961, 973–975; 701/14, 16, 120; 342/29, 33, 36
See application file for complete search history.

(56) References Cited

U.S. PATENT DOCUMENTS

| 6,963,291 | B2 | 11/2005 | Holforty et al. |
| 8,099,201 | B1 | 1/2012 | Barber et al. |
| 8,108,133 | B2 * | 1/2012 | Haissig ................ G08G 5/0008 701/116 |

(Continued)

FOREIGN PATENT DOCUMENTS

WO  2018/020303 A1  2/2018

OTHER PUBLICATIONS

Mundra, Anand M., et al., "Feasibility and Benefits of a Cockpit Traffic Display-Based Separation Procedure for Single Runway Arrivals and Departures," 8th USA/Europe Air Traffic Management Research and Development Seminar (ATM2009), Jun. 30, 2009.

(Continued)

*Primary Examiner* — Ojiako K Nwugo
(74) *Attorney, Agent, or Firm* — Lorenz & Kopf, LLP

(57) ABSTRACT

A system for providing visual cues to flight crew on multiple displays during an approach is provided. The system is configured to: position, on a synthetic vision system (SVS) and/or head-up display (HUD), one or more traffic icons each representative of a lead aircraft ahead of the ownship; designate a lead aircraft as traffic to follow (TTF) via selection of a first traffic icon representative of one lead aircraft displayed on a navigation display and via selection of a second traffic icon representative of the same lead aircraft displayed on the SVS, wherein selection of either the first traffic icon or the second traffic icon results in designation of the selected lead aircraft as TTF and results in both the first traffic icon and the second traffic icon to more visually stand out; and position, on a horizontal situation indicator, a third TTF icon representative of the lead aircraft when a TTF has been designated.

20 Claims, 10 Drawing Sheets

(56) References Cited

U.S. PATENT DOCUMENTS

| | | | |
|---|---|---|---|
| 8,566,012 B1 | 10/2013 | Shafaat et al. | |
| 9,478,140 B2* | 10/2016 | Kathirvel | G08G 5/0043 |
| 9,501,936 B2 | 11/2016 | Trefilova et al. | |
| 9,536,434 B2* | 1/2017 | Scharl | G08G 5/0021 |
| 9,646,504 B2 | 5/2017 | Shafaat et al. | |
| 10,096,254 B2* | 10/2018 | Nauman | G08G 5/0021 |
| 10,140,878 B2 | 11/2018 | Schupp et al. | |
| 2006/0265109 A1* | 11/2006 | Canu-Chiesa | G08G 5/045 |
| | | | 701/3 |
| 2008/0106438 A1* | 5/2008 | Clark | G08G 5/0078 |
| | | | 340/972 |
| 2009/0051570 A1* | 2/2009 | Clark | G08G 5/0021 |
| | | | 340/971 |
| 2009/0153343 A1* | 6/2009 | Shafaat | G01C 23/005 |
| | | | 340/686.1 |
| 2010/0017127 A1* | 1/2010 | Pepitone | G08G 5/0008 |
| | | | 701/301 |
| 2010/0211237 A1 | 8/2010 | Nichols et al. | |
| 2011/0066360 A1* | 3/2011 | Haissig | G08G 5/0008 |
| | | | 701/116 |
| 2011/0125399 A1* | 5/2011 | Clark | G08G 5/0008 |
| | | | 701/532 |
| 2013/0113635 A1* | 5/2013 | Whitlow | G01C 23/00 |
| | | | 340/945 |
| 2013/0113819 A1* | 5/2013 | Gurusamy | G08G 5/0021 |
| | | | 345/592 |
| 2014/0249701 A1 | 9/2014 | Latsu-Dake et al. | |
| 2016/0063869 A1* | 3/2016 | Kathirvel | G08G 5/0043 |
| | | | 701/3 |
| 2017/0030734 A1 | 2/2017 | Shafaat et al. | |
| 2018/0233051 A1 | 8/2018 | Manberg et al. | |
| 2019/0019422 A1 | 1/2019 | Khatwa et al. | |

OTHER PUBLICATIONS

Lawrence J. Prinzel III, et al., "Flight Deck-Based Delegated separation: Evaluation of an On-board Interval Management System with Synthetic and Enhanced Vision Technology," 2011, Retrieved at https://ntrs.nasa.gov/archive/nasa/casi.ntrs.nasa.gov/20110020269.pdf on Feb. 1, 2019.

Stassen, Hans, et al. "Multi-Purpose Cockpit Display of Traffic Information: Overview and Development of Performance Requirements," AIAA Guidance, Navigation, and Control Conference, p. 8455, Retrieved at https://www.mitre.org/sites/defaultffiles/pdf/10_2768.pdf on Feb. 1, 2019.

* cited by examiner

DGS < 0 kts
(backchevron)

DGS = 1 to 24 kts
(chevron)

DGS = 25 to 49 kts
(directional triangle)

DGS = 50 to X kts
(directional triangle with chevron)

PRESENTATION OF 2D AND 3D ASSISTED VISUAL SEPARATION INFORMATION

TECHNICAL FIELD

Embodiments of the subject matter described herein relate generally to aircraft monitoring and alerting systems. More particularly, embodiments of the subject matter relate to systems and methods for monitoring and navigating aircraft during approach procedures using visual separation rules.

BACKGROUND

CDTI (Cockpit Display of Traffic Information) may allow a flight crew to maintain ownship separation from a target aircraft that the ownship follows when visual contact is lost (e.g., due to hazy or night conditions) by using the information provided by the CDTI as a substitute for an out-the-window view. CDTI may be provided to the flight crew via a navigation display, which can provide a two-dimensional (2D) view. The flight crew may, however, have other displays, such as a primary flight display (PFD), which can provide a three-dimensional (3D) view, within the flight crew's field of view during procedures when following target aircraft. These other displays may not provide CDTI. A flight crew's situational awareness may be improved by a simultaneous display of 2D and 3D information related to a target aircraft that the ownship follows.

Hence, it is desirable to provide the CDTI on the PFD and/or head up display (HUD) to achieve simultaneous display of 2D and 3D information related to a target aircraft that the ownship follows. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a visualization assistance system for providing visual cues to flight crew on multiple displays while following a proceeding aircraft during an approach using visual separation rules is provided. The visualization assistance system includes one or more processors configured by programming instructions on non-transient computer readable media. The visualization assistance system is configured to: position, on an SVS (synthetic vision system) display section of a primary flight display (PFD) and/or head up display (HUD), one or more traffic icons, wherein each is representative of a lead aircraft ahead of an ownship and wherein the size of each traffic icon is scaled based on proximity to the ownship; designate a lead aircraft as traffic to follow (TTF) via selection of a first traffic icon representative of one lead aircraft displayed on a navigation display (ND) or via selection of a second traffic icon representative of the same lead aircraft displayed on the SVS (on the PFD and/or HUD), wherein selection of either the first traffic icon or the second traffic icon results in designation of the selected lead aircraft as TTF and results in both the first traffic icon and the second traffic icon in being made to more visually stand out; and position, on an HSI (horizontal situation indicator) section of the PFD, a third TTF icon representative of the lead aircraft when a TTF has been designated.

In another embodiment, a computer-implemented method in a trail aircraft for providing visual cues to flight crew on multiple displays while following a proceeding aircraft during an approach using visual separation rules is provided. The method includes: positioning, on an SVS (synthetic vision system) display section of a primary flight display (PFD) and/or HUD, one or more traffic icons wherein each is representative of a lead aircraft ahead of an ownship and wherein the size of each traffic icon is scaled based on proximity to the ownship; designating a lead aircraft as traffic to follow (TTF) via selection of a first traffic icon representative of one lead aircraft displayed on a navigation display (ND) or via selection of a second traffic icon representative of the same lead aircraft displayed on the SVS, wherein selection of either the first traffic icon or the second traffic icon results in designation of the selected lead aircraft as TTF and results in both the first traffic icon and the second traffic icon being made to more visually stand out; and positioning, on an HSI (horizontal situation indicator) section of the PFD, a third TTF icon representative of the lead aircraft when a TTF has been designated.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for increasing the situational awareness of the flight crew when using information displayed in the cockpit such as CDTI to maintain ownship separation when visual contact is lost. The apparatus, systems, techniques and articles provided herein can provide a simultaneous 2D and 3D presentation of designated traffic and CDTI to enhance awareness of traffic to follow, separation criteria and differential groundspeed.

Figure 1:
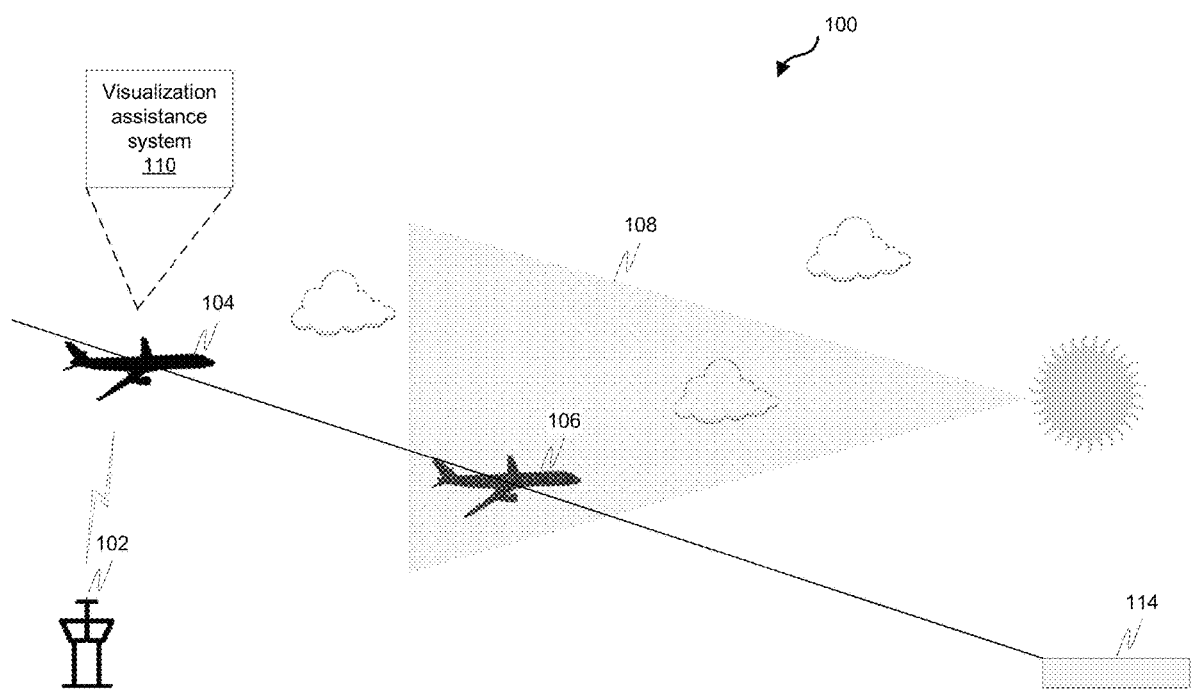
FIG. 1 is a diagram depicting an example operating environment in which visualization assistance queues may be provided for flight crew use, in accordance with some embodiments.

FIG. 1 is a diagram depicting an example operating environment 100 in which visualization assistance queues may be provided for flight crew use. In poor visibility situations it may be difficult for flight crew to maintain a desired visual separation from a target aircraft. To support flight crew situation and traffic awareness, the apparatus, systems, techniques and articles described herein provide visualization assistance queues on multiple cockpit display screens that can help the flight crew maintain separation between a target aircraft and an ownship during an approach using visual separation rules.

In the example environment 100, air traffic control (ATC) 102 provides clearance information to the flight crew on an ownship 104 indicating the identification designation for a target aircraft 106 to follow, for example, during a landing procedure. The flight crew of the ownship may report "Traffic in sight" to ATC 102, designate the target aircraft 106 in its aircraft equipment, and select an alerting distance threshold (e.g., a pre-selected distance) as a minimum separation distance between the ownship 104 and the target aircraft 106 the flight crew would like to maintain. The flight crew of the ownship 104 may adjust the ownship aircraft speed based on an out the window view of the target aircraft 106 to maintain a desired ownship separation from the target aircraft 106. If visual contact with the target aircraft 106 is lost (e.g., due to haze 108), the flight crew may adjust the aircraft speed of the ownship 104 based on information provided by a visualization assistance system 110 to maintain ownship separation. Use of the visualization assistance system 110 can improve flight crew situational awareness. Use of the visualization assistance system 110 may end when the target aircraft 106 lands, e.g., at a runway 114.

Figure 2:
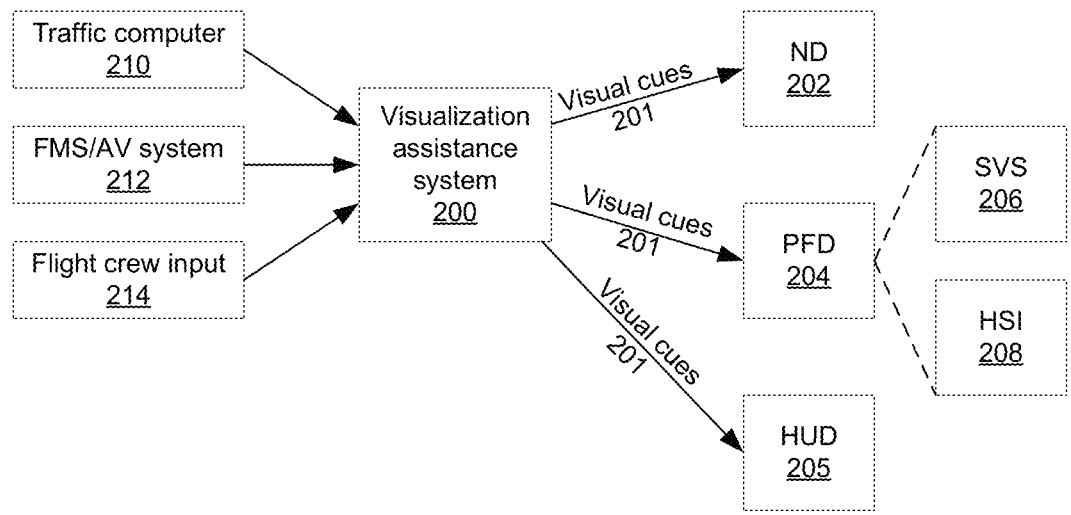
FIG. 2 is a block diagram of an example visualization assistance system, in accordance with some embodiments.
Figure 3A:
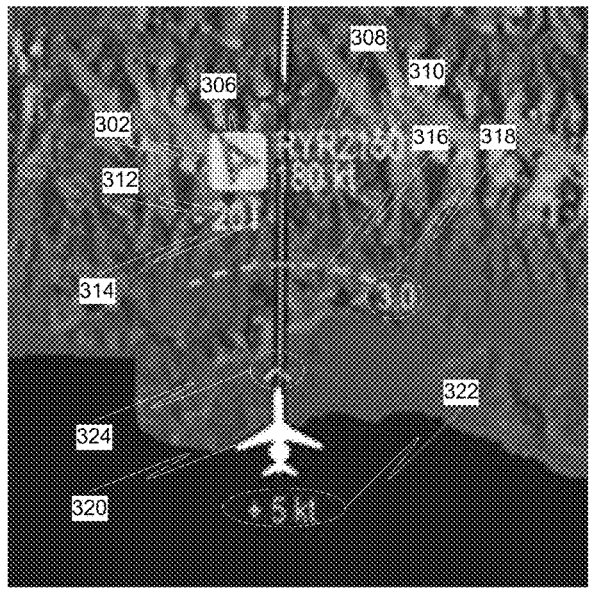
FIGS. 3A, 3B, 3C, 3D, and 4 are diagrams depicting example visualization assistance queues that the example visualization system may cause to be displayed on a ND for flight crew use during an approach using visual separation rules, in accordance with some embodiments.
Figure 3B:
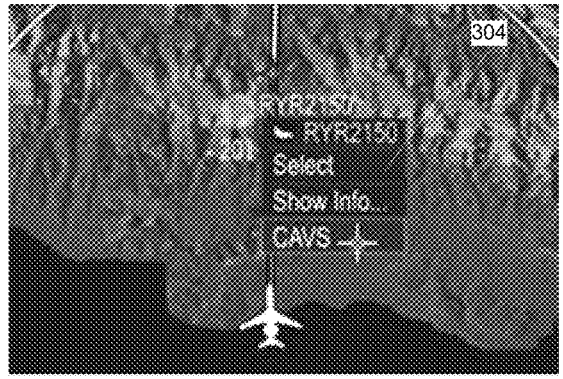
Figure 3C:
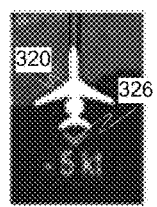
Figure 3C:
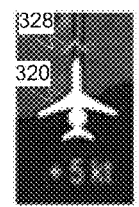
Figure 3C:
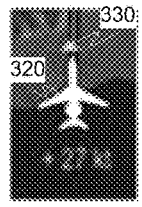
Figure 3C:
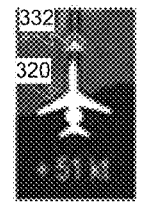
Figure 3D:
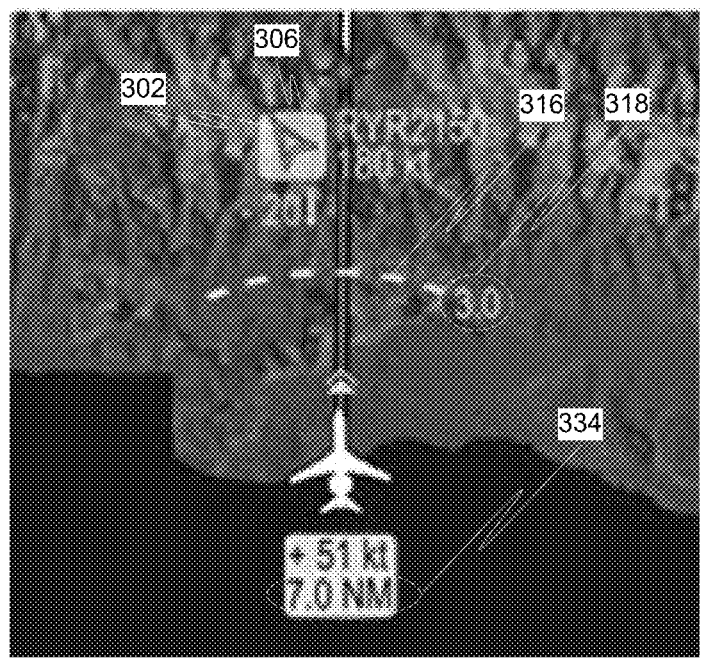
Figure 4:
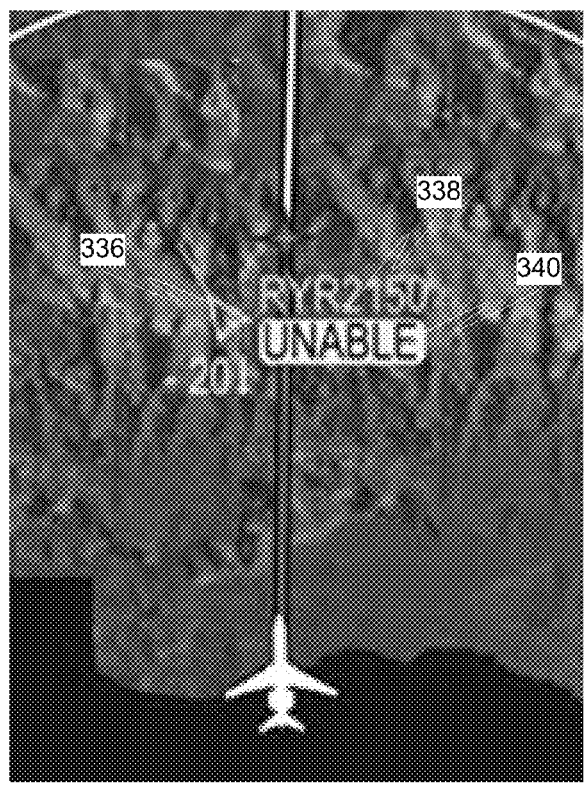

FIG. 2 is a block diagram of an example visualization assistance system 200. The example visualization assistance system 200 is configured to provide visual cues 201 to flight crew on multiple displays—a navigation display (ND) 202, a primary flight display (PFD) 204, and/or a heads up display (HUD) 205—while an ownship follows a lead (target) aircraft during an approach procedure that requires the use of visual separation rules. This can help make the flight crew more situational aware as the flight crew adjusts its view between the window to the outside, the ND 202, the PFD 204, and/or HUD 205. For a PFD 204 that provides both a synthetic vision system (SVS) 206 and a horizontal situation indicator (HSI) 208, the example visualization assistance system 200 is configured to provide visual cues to both the SVS 206 and the HSI 208, to additionally improve the situational awareness of flight crew by providing four different sources of visual cues. The example visualization assistance system 200 is configured to retrieve traffic data from a traffic computer 210 onboard the ownship from a traffic source such as ADS-B, ADS-R, TIS-B or other data from the preceding aircraft, aircraft data from avionics systems 212 such as the FMS (flight management system), and flight crew input 214.

The example visualization assistance system 200 is implemented using a controller. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

FIGS. 3A, 3B, 3C, 3D, and 4 are diagrams depicting example visualization assistance queues that the example visualization system 200 may cause to be displayed on a ND 202 for flight crew use during an approach using visual separation rules. FIGS. 5A, 5B, 6, 7A, 7B, 8 and 9 are diagrams depicting example visualization assistance queues that the example visualization system 200 may cause to be displayed on a PFD 204 for flight crew use during an approach using visual separation rules.

The example visualization assistance system 200 is configured to receive a selection of a target icon 302, that represents a target aircraft ahead of the ownship. The ND may display one or more potential target aircraft via icons. The selection of an icon 302 may cause the opening of a dialog box 304 from which the selected icon and the aircraft represented by the icon 302 may be designated as traffic to follow (TTF) using the example visualization assistance system 200.

Upon receiving a selection, the example system 200 is configured to make the selected target icon 302 become more visually pronounced, for example, by changing the color of the icon 302 (e.g. to green) and/or causing an area 306 surrounding the target icon to be displayed in a specific shape or color (e.g., green box). The example system 200 is configured to cause the display of a call sign (or flight ID) indicator 308 that provides the call sign/flight ID of the target aircraft, cause a display of a ground speed indicator 310 that provides the ground speed of the target aircraft, and relative numerical altitude 312 with a +sign for traffic above the ownship or—sign for traffic below the ownship. Traffic the same altitude is displayed with no preceding symbol. Also, the fixed size vertical sense arrow 314 is displayed as an upward arrow for ascending traffic and a downward arrow for descending traffics. The example system 200 is configured to provide a range ring symbol 316 that indicates a relative distance in front of an ownship symbol on the ND and a numeric value 318 for a flight crew selected minimum range value wherein the minimum range value (threshold value) is equal to a minimum flight crew selected desired separation distance between the target aircraft and the ownship. The example system 200 is configured to cause the distance between the selected target icon 302, the range ring symbol 316 and an ownship symbol 320 on the ND to be proportional to the horizontal distance between the actual target aircraft, the threshold distance and the actual ownship. The visualization assistance system 200 is further configured to systematically adjust the position of the selected target icon 302 relative to the first range ring symbol 316 and the ownship symbol 320 on the ND.

The example system 200 is further configured to provide a differential ground speed widget 322 that provides an alpha numeric indication of the differential ground speed (DGS) between the target aircraft and the ownship, and a differential ground speed symbol 324 that provides a graphical indication of whether the ownship is slower or faster than preceding aircraft 306. The differential ground speed symbol 324 is configured to provide a differential speed indicator symbol that indicates a range of differential speeds between the target and the ownship. In one example, a back chevron 326 below an ownship symbol 320 indicates a negative differential ground speed (e.g., the ownship speed is slower than preceding aircraft), a single chevron 328 above the ownship symbol 320 indicates a positive differential speed of 1 to 24 knots (e.g., the ownship is slightly faster that preceding aircraft), a directional triangle 330 above the ownship symbol 320 indicates a positive differential speed of 25 to 49 knots, and a directional triangle with a chevron 332 above the ownship symbol 320 indicates a positive differential speed of 50 or more knots. The example visualization assistance system 200 may also be configured to cause the display of the horizontal range between the target aircraft and the ownship in a location 334 on the ND adjacent to the differential ground speed magnitude. When the distance between the ownship and the target aircraft is less than the flight crew selected minimum range value 318 or the received traffic data (e.g., ADS-B data), which provides data from the target aircraft on its position, heading, and velocity, is of low quality, the example visualization assistance system 200 is configured to cause a caution alert to be presented, for example, by changing the color of the target symbol 336 and call sign/flight ID 338 (e.g., to an amber color), to cause the display of a label 340 (e.g., an UNABLE label) adjacent to the traffic icon 336, and to cause the area surrounding the target icon (e.g., area 306) to no longer be displayed in the specific shape or color in which it was displayed before the presentation of the caution alert.

To provide visual cues to the flight crew on multiple displays (e.g., ND 202 and PFD 204), the example visualization assistance system 200 is configured to provide icon, widgets and symbols on the PFD 204 that are similar to those provided by the visualization assistance system 200 on the ND 202.

Figure 5A:
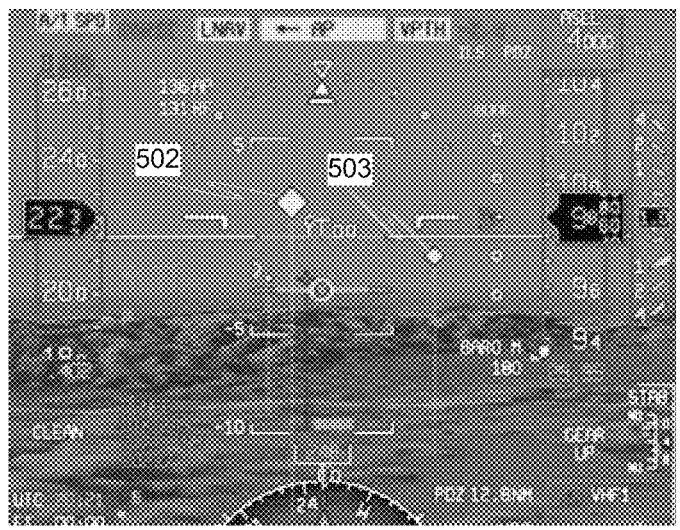
FIGS. 5A, 5B, 6, 7A, 7B, 8 and 9 are diagrams depicting example visualization assistance queues that the example visualization system may cause to be displayed on a PFD for flight crew use during an approach using visual separation rules, in accordance with some embodiments.
Figure 5B:
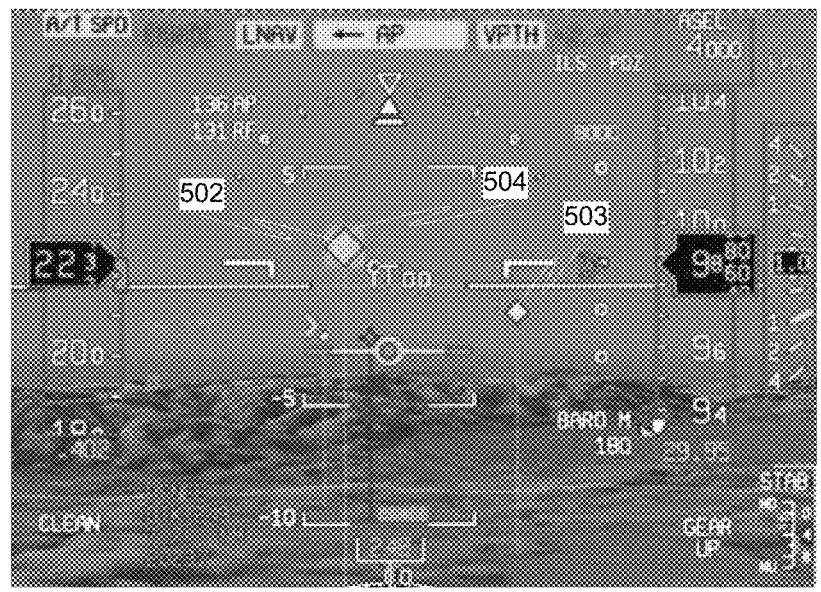

As illustrated in FIGS. 5A and 5B, the example visualization assistance system 200 is configured to position, on an SVS (a three dimensional (3D) synthetic vision system) display section of a primary flight display (PFD), one or more traffic icons 502, 503 each representative of an aircraft ahead of the ownship, wherein the size of each traffic icon 502, 503 is scaled based on proximity to the ownship, and wherein a traffic icon 503 for a first traffic aircraft is smaller than a traffic icon 502 for a second traffic aircraft when the first traffic aircraft is further away from the ownship than the second traffic aircraft.

The example visualization assistance system 200 is configured to receive the selection of one traffic icon 502 of the traffic icons 502, 503 on the SVS and designate an aircraft represented by the selected icon 502 as traffic to follow (TTF) via the selection of the traffic icon 502. The example visualization assistance system 200 is therefore configured such that the selection of either a traffic icon 302 on the ND or a traffic icon 502 on the SVS results in designation of the selected aircraft as TTF and results in both the traffic icon 302 on the ND and the traffic icon 502 on the SVS being made to more visually stand out (e.g., pixels 504 surrounding the icon 502 may be made to be displayed in a different color or intensity or shading the pixels representing the icon 502 in a different color or intensity). Similar visual presentations could be provided on a head-up display (HUD).

Figure 6:
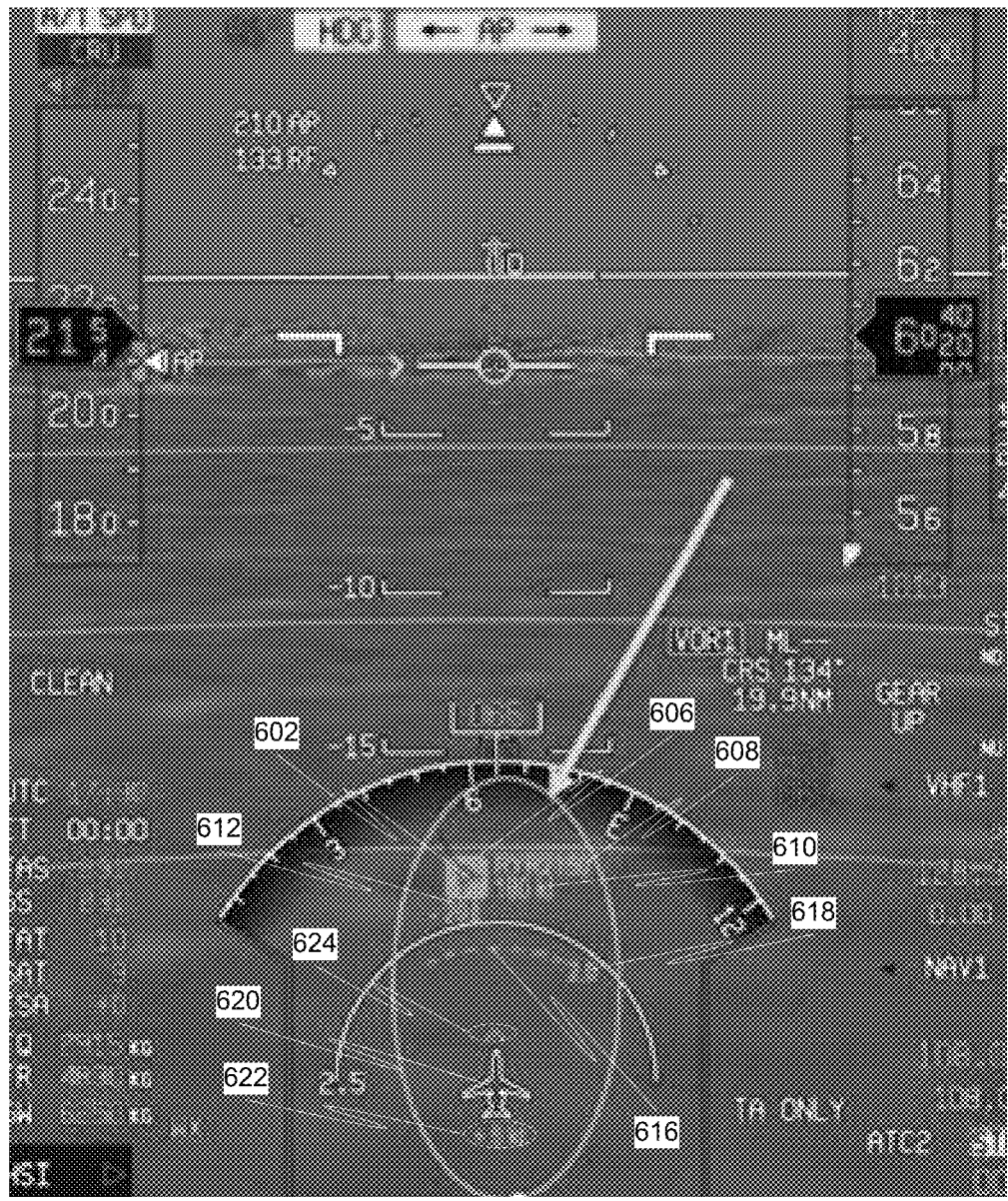

As illustrated in FIG. 6, the example visualization assistance system 200 is also configured to position, on an HSI (horizontal situation indicator) section of the PFD, a TTF icon 602 representative of the lead aircraft when a TTF has been designated. Similar to the traffic icon 302 on the ND, the TTF icon 602 may include a designation of the call sign/flight ID 608 for the TTF, the ground speed 610 of the TTF, and a numerical representation of an altitude difference 612 between the TTF and the ownship.

The example visualization assistance system 200 is configured to cause a range ring symbol 616 that indicates a relative distance in front of an ownship and a numeric representation 618 of the flight crew selected threshold distance (similar to range ring symbol 316) to be displayed on the HSI section of the PFD. The distance between the TTF icon 602, the range ring symbol 616 and an ownship symbol 620 on the HSI is proportional to the horizontal distance between the actual TTF, the threshold distance and the actual ownship. Selection of either the traffic icon 302 on the ND, the traffic icon 502 on the SVS, or the TTF icon 602 allows for entry of the threshold distance from the ND, the SVS or the HSI. The example visualization assistance system 200 is further configured to systematically adjust (e.g., periodically) the position of the TTF icon 602 relative to the range ring symbol 616 and the ownship symbol 620 on the HSI.

Figure 7A:
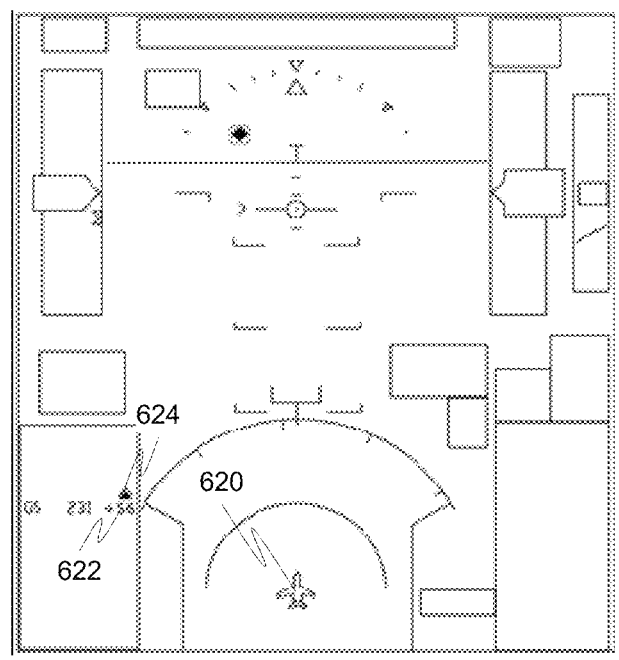
Figure 7B:
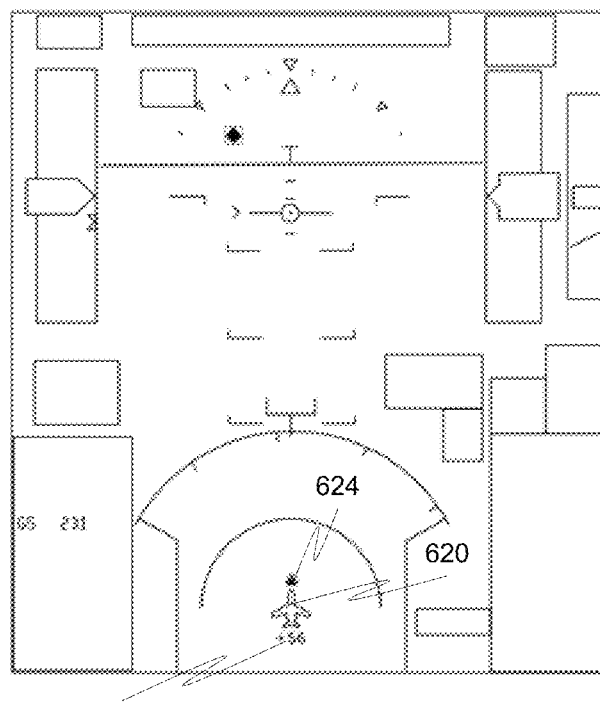

The example visualization assistance system 200 is configured to cause to be displayed, on the PFD, a numerical representation 622 of the differential ground speed between the TTF and the ownship and a differential ground speed symbol 624 representative of a range of differential ground speeds. In one example, the example visualization assistance system 200 is configured to cause to be displayed, adjacent to the ownship symbol 620 on the HSI, the numerical representation 622 of the differential ground speed difference between the TTF and the ownship, and the differential ground speed symbol 624 representative of a range of differential ground speeds as illustrated in FIGS. 6 and 7B. In another example, the visualization assistance system 200 is configured to cause the numerical representation 622 of the differential ground speed and the differential ground speed symbol 624 to be displayed adjacent to an existing groundspeed display on the PFD as illustrated in FIG. 7A.

Figure 8:
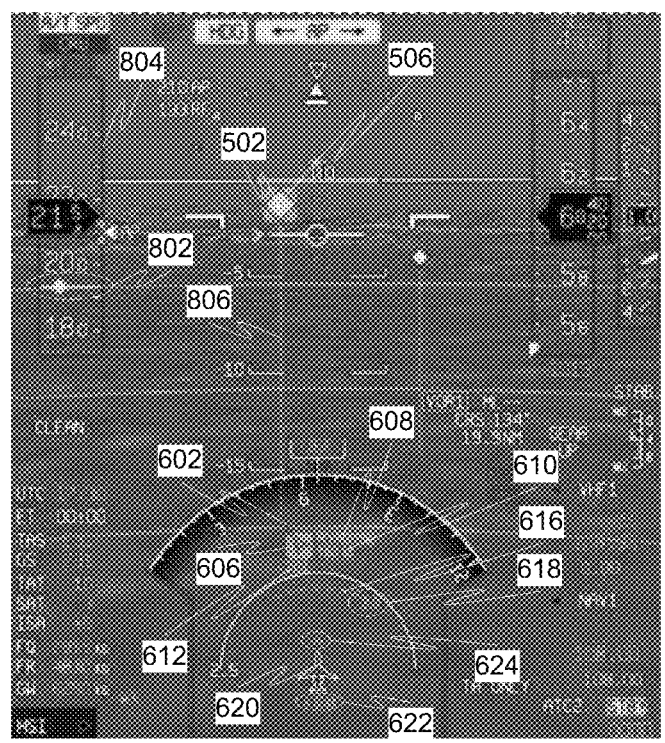

As illustrated in FIG. 8, the example visualization assistance system 200 is configured to estimate an airspeed target 802 at which to fly to maintain a desired distance between the ownship and the TTF and cause the estimated airspeed target 802 to be displayed on the SVS. The estimated airspeed target 802 may be displayed (e.g., green line and diamond) in an airspeed indicator section 804 on the SVS or HUD. The example visualization assistance system 200 is configured to estimate the airspeed target 802 using a current ownship airspeed, wind speed and direction, current ownship groundspeed, and differential groundspeed between the TTF and the ownship. This information may be determined from information from the traffic computer 210, sensors, and avionics systems 212 on the ownship. The example visualization assistance system 200 is further configured to cause a vertical line 806 from the TTF icon 502 displayed on the SVS to provide an indication of the distance between the TTF and the ownship. Also, the visualization assistance system 200 could be configured to provide some or all of the features depicting in FIG. 8 based on the target platform or the personal preference of the flight crew.

Figure 9:

As illustrated in FIG. 9, the example visualization assistance system 200 is configured to cause the state of the TTF icon 502 displayed on the SVS and the TTF icon 602 displayed on HSI to change (e.g., different color and/or shape) when the TTF transitions to a TCAS Traffic Advisory (TA) state due to inadequate separation. The example visualization assistance system 200 is configured to cause an alert to be displayed on both the ND and the PFD when traffic that becomes a potential hazard is detected. The TFF 602 may also no longer meets minimum specified criteria, such as the threshold distance is violated or the ADS-B has dropped out. The example visualization assistance system 200 is configured to cause similar types of range advisory alerts to be displayed on both the ND and the PFD.

Figure 10:
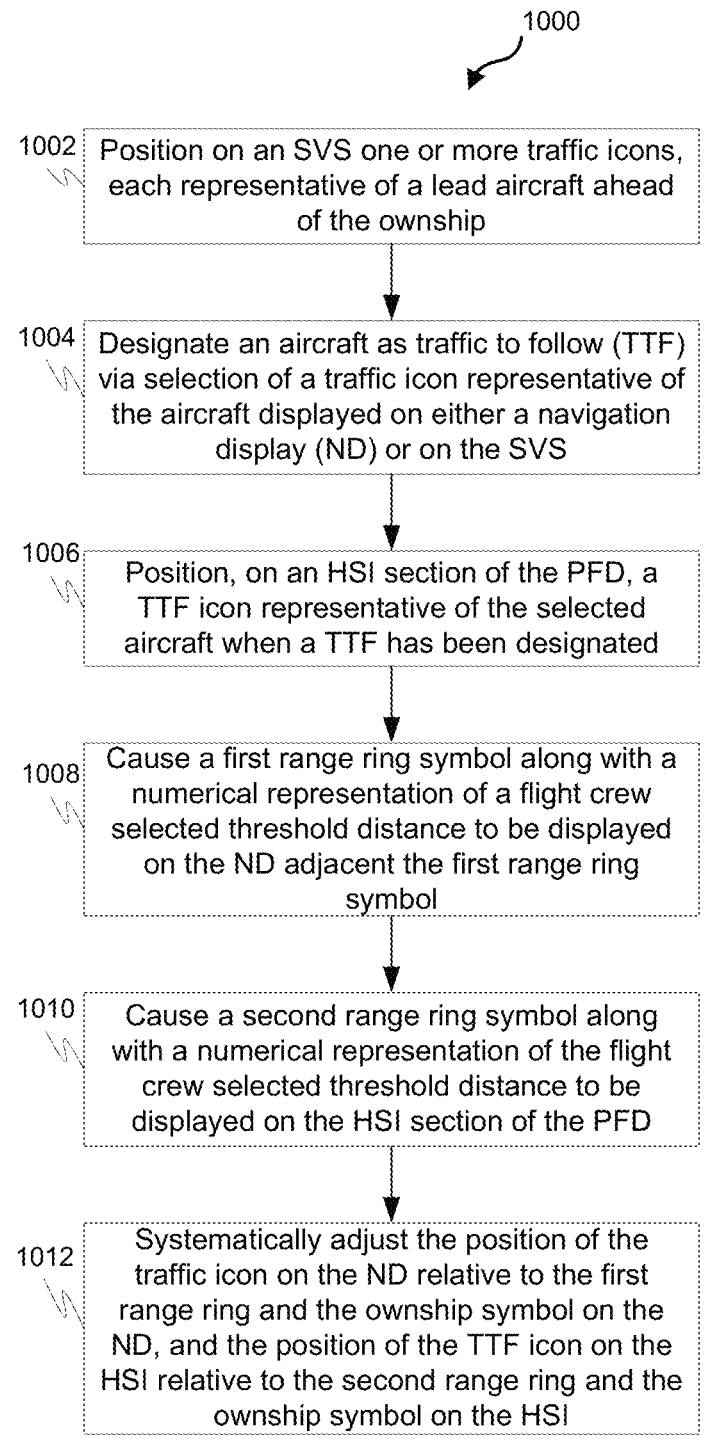
FIG. 10 is a process flow chart depicting an example process in a trail aircraft for providing visual cues to flight crew on multiple displays (e.g., ND and PFD) while following a proceeding aircraft during an approach using visual separation rules, in accordance with some embodiments.

FIG. 10 is a process flow chart depicting an example process 1000 in a trail aircraft for providing visual and aural cues to flight crew on multiple displays (e.g., ND, PFD, and HUD) while following a proceeding aircraft during an approach using visual separation rules. The order of operation within the process 1000 is not limited to the sequential execution as illustrated in the figure, but may be performed in one or more varying orders as applicable and in accordance with the present disclosure.

The example process 1000 includes positioning on an SVS (and/or HUD) one or more traffic icons, each representative of a lead aircraft ahead of the ownship (operation 1002). The size of each traffic icon is scaled based on proximity to ownship. For example, a traffic icon may be smaller when the lead aircraft is further away from the ownship.

The example process 1000 includes designating an aircraft as traffic to follow (TTF) via selection of a traffic icon representative of the aircraft displayed on either a navigation display (ND) or on the SVS/HUD (operation 1004). Selection of either a traffic icon on the ND or SVS/HUD results in designation of the lead aircraft represented by the traffic icon as TTF and results in both traffic icons on the ND and SVS/HUD being made to more visually stand out (e.g., pixels surrounding the icon to be displayed in a different color or intensity or shading of the pixels representing the icon to be displayed in a different color or intensity);

The example process 1000 includes positioning, on an HSI (horizontal situation indicator) section of the PFD, a TTF icon representative of the selected aircraft when a TTF has been designated (operation 1006). The TTF icon on the HSI may include a designation of the call sign/flight ID for the TTF, the ground speed of the TTF, and a numerical representation of an altitude difference between the TTF and the ownship.

The example process 1000 includes causing a first range ring symbol along with a numerical representation of a flight crew selected threshold distance to be displayed on the ND adjacent the first range ring symbol (operation 1008). The threshold distance is flight crew selected as a minimum separation distance between the TTF and the ownship. The distance between the traffic icon, the first range ring and an ownship symbol on the ND is proportional to the horizontal distance between the actual TTF, the threshold distance and the actual ownship The example process 1000 includes causing a second range ring symbol along with a numerical representation of the flight crew selected threshold distance to be displayed on the HSI section of the PFD (operation 1010). The distance between the traffic icon, the second range ring and an ownship symbol on the HSI is proportional to the horizontal distance between the actual TTF, the threshold distance and the actual ownship. Also, selection of either the traffic icon on the ND, the traffic icon on the SVS, or the TTF icon on the HSI allows for entry of the threshold distance from the ND, the SVS or the HSI.

The example process 1000 further includes systematically adjusting the position of the traffic icon on the ND relative to the first range ring and the ownship symbol on the ND, and the position of the TTF icon on the HSI relative to the second range ring and the ownship symbol on the HSI (operation 1012).

Described herein are apparatus, systems, techniques and articles for increasing the situational awareness of the flight crew by providing a simultaneous two-dimensional (2D) and three-dimensional (3D) presentation of visual cues on multiple displays to enhance awareness of traffic to follow, separation criteria and/or differential ground speed.

In one embodiment, a visualization assistance system for providing visual cues to flight crew on multiple displays while following a proceeding aircraft during an approach using visual separation rules is provided. The visualization assistance system comprises one or more processors configured by programming instructions on non-transient computer readable media. The visualization assistance system is configured to: position, on an SVS (synthetic vision system) display section of a primary flight display (PFD) or head up display (HUD), one or more traffic icons each representative of a lead aircraft ahead of the ownship wherein the size of each traffic icon is scaled based on proximity to ownship; designate a lead aircraft as traffic to follow (TTF) via selection of a first traffic icon representative of one lead aircraft displayed on a navigation display (ND) or via selection of a second traffic icon representative of the same lead aircraft displayed on the SVS/HUD, wherein selection of either the first traffic icon or the second traffic icon results in designation of the selected lead aircraft as TTF and results in both the first traffic icon and the second traffic icon being made to more visually stand out; and position, on an HSI (horizontal situation indicator) section of the PFD, a third TTF icon representative of the lead aircraft when a TTF has been designated.

These aspects and other embodiments may include one or more of the following features. The third TTF icon may include a designation of the call sign/flight ID for the TTF, the ground speed of the TTF, and a numerical representation of an altitude difference between the TTF and the ownship. The visualization assistance system may be further configured to: cause a first range ring symbol along with a numerical representation of a flight crew selected threshold distance to be displayed on the ND adjacent the first range ring symbol, wherein the threshold distance is equal to a minimum flight crew selected separation distance between the TTF and the ownship, and wherein the distance between the first traffic icon, the first range ring symbol and an ownship symbol on the ND is proportional to the horizontal distance between the actual TTF, the threshold distance and the actual ownship; and cause a second range ring symbol along with a numerical representation of the flight crew selected threshold distance to be displayed on the HSI section of the PFD, wherein the distance between the third traffic icon, the second range ring symbol and an ownship symbol on the HSI is proportional to the horizontal distance between the actual TTF, the threshold distance and the actual ownship, and wherein selection of either the first traffic icon, the second traffic icon, or the third traffic icon allows for entry of the threshold distance from the ND, the SVS or the HSI. The visualization assistance system may be further configured to systematically adjust the position of the first traffic icon relative to the first range ring symbol and the ownship symbol on the ND, and the position of the third traffic icon relative to the second range ring symbol and the ownship symbol on the HSI. The visualization assistance system may be further configured to: cause to be displayed, adjacent to an ownship symbol on the ND, a numerical representation of the differential ground speed between the TTF and ownship and a differential ground speed symbol representative of a range of differential ground speeds; and cause to be displayed, on the PFD, a numerical representation of the differential ground speed between the TTF and the ownship and a differential ground speed symbol representative of a range of differential ground speeds. The visualization assistance may be configured to cause the numerical representation of the differential ground speed and the differential ground speed symbol to be displayed either adjacent to an ownship symbol on the SVS or adjacent to an existing groundspeed display on the SVS. The visualization assistance system may be further configured to: estimate an airspeed target at which to fly to maintain a desired distance between the ownship and the TTF; and cause the estimated airspeed target to be displayed on the SVS. The visualization assistance system may be configured to cause the estimated airspeed target to be displayed in an airspeed indicator section on the SVS. The visualization assistance system may be configured to estimate the airspeed target using a current ownship airspeed, wind speed and direction, current ownship groundspeed, and differential groundspeed between the TTF and the ownship. The visualization assistance system may be further configured to cause a vertical line from TTF symbol displayed on SVS to TTF symbol displayed on PFD to provide indication of how close TTF is from ownship. The visualization assistance system may be further configured to cause the state of the TFF symbol on SVS and the TTF symbol on the HSI to change when the TTF no longer meets minimum CAVS criteria.

In another embodiment, a computer-implemented method in a trail aircraft for providing visual cues to flight crew on multiple displays while following a proceeding aircraft during an approach using visual separation rules, the method comprising: positioning, on an SVS (synthetic vision system) display section of a primary flight display (PFD) or HUD, one or more traffic icons wherein each is representative of a lead aircraft ahead of an ownship and wherein the size of each traffic icon is scaled based on proximity to the ownship; designating a lead aircraft as traffic to follow (TTF) via selection of a first traffic icon representative of one lead aircraft displayed on a navigation display (ND) or via selection of a second traffic icon representative of the same lead aircraft displayed on the SVS, wherein selection of either the first traffic icon or the second traffic icon results in designation of the selected lead aircraft as TTF and results in both the first traffic icon and the second traffic icon being made to more visually stand out; and positioning, on an HSI (horizontal situation indicator) section of the PFD, a third TTF icon representative of the lead aircraft when a TTF has been designated.

These aspects and other embodiments may include one or more of the following features. The third TTF icon may include a designation of the call sign/flight ID for the TTF, the ground speed of the TTF, and a numerical representation of an altitude difference between the TTF and the ownship. The method may further comprise: causing a first range ring symbol along with a numerical representation of a flight crew selected threshold distance to be displayed on the ND adjacent the first range ring symbol, wherein the threshold distance is equal to a minimum flight crew selected separation distance between the TTF and the ownship, and wherein the distance between the first traffic icon, the first range ring symbol and an ownship symbol on the ND is proportional to the horizontal distance between the actual TTF, the threshold distance and the actual ownship; and causing a second range ring symbol along with a numerical representation of the flight crew selected threshold distance to be displayed on the HSI section of the PFD, wherein the distance between the third traffic icon, the second range ring symbol and an ownship symbol on the HSI is proportional to the horizontal distance between the actual TTF, the threshold distance and the actual ownship, and wherein selection of either the first traffic icon, the second traffic icon, or the third traffic icon allows for entry of the threshold distance from the ND, the SVS or the HSI. The method may further comprise systematically adjusting the position of the first traffic icon relative to the first range ring symbol and the ownship symbol on the ND, and the position of the third traffic icon relative to the second range ring symbol and the ownship symbol on the HSI. The method may further comprise: causing to be displayed, adjacent to an ownship symbol on the ND, a numerical representation of the differential ground speed between the TTF and ownship and a differential ground speed symbol representative of a range of differential ground speeds; and causing to be displayed, on the SVS, a numerical representation of the differential ground speed between the TTF and the ownship and a differential ground speed symbol representative of a range of differential ground speeds. The method may comprise causing the numerical representation of the differential ground speed and the differential ground speed symbol to be displayed either adjacent to an ownship symbol on the SVS or adjacent to an existing groundspeed display on the SVS/HUD. The method may further comprise: estimating an airspeed target at which to fly to maintain a desired distance between the ownship and the TTF; and causing the estimated airspeed target to be displayed on the SVS/HUD. The method may comprise causing the estimated airspeed target to be displayed in an airspeed indicator section on the SVS/HUD. The method may comprise estimating the airspeed target using a current ownship airspeed, wind speed and direction, current ownship groundspeed, and differential groundspeed between the TTF and the ownship. The method may further comprise causing a vertical line from TTF symbol displayed on SVS to TTF symbol displayed on PFD to provide indication of how close the TTF is from ownship. The method may further comprise causing the state of the TFF symbol on SVS and the TTF symbol on the HSI to change when the TTF no longer meets minimum CAVS criteria.

In another embodiment, a non-transient computer readable media encoded with programming instructions that when executed by one or more processors in a trail aircraft causes the one or more processors to perform a method of providing visual cues to flight crew on multiple displays while the trail aircraft follows a proceeding aircraft during an approach using visual separation rules is provided. The method comprises: positioning, on an SVS (synthetic vision system) display section of a primary flight display (PFD) or HUD, one or more traffic icons wherein each is representative of a lead aircraft ahead of an ownship and wherein the size of each traffic icon is scaled based on proximity to the ownship; designating a lead aircraft as traffic to follow (TTF) via selection of a first traffic icon representative of one lead aircraft displayed on a navigation display (ND) or via selection of a second traffic icon representative of the same lead aircraft displayed on the SVS, wherein selection of either the first traffic icon or the second traffic icon results in designation of the selected lead aircraft as TTF and results in both the first traffic icon and the second traffic icon being made to more visually stand out; and positioning, on an HSI (horizontal situation indicator) section of the PFD, a third TTF icon representative of the lead aircraft when a TTF has been designated.

In another embodiment, a visualization assistance system for providing visual cues to flight crew on multiple displays (e.g., ND and PFD) while following a proceeding aircraft during an approach using visual separation rules is provided. The visualization assistance system comprises one or more processors configured by programming instructions on non-transient computer readable media.

The visualization assistance system is configured, with respect to the ND, to: receive the selection of an icon displayed on a navigation display (ND) that represents an aircraft ahead of the ownship aircraft, designate the selected aircraft as traffic to follow (TTF), and cause the selected icon to be highlighted; cause a range ring symbol along with a designation of a flight crew selected threshold distance to be displayed on the ND, the threshold distance equal to minimum flight crew selected separation distance between the TTF and ownship; and cause the display of a numerical representation of the differential ground speed between the TTF and ownship and a differential ground speed symbol representative of a range of differential ground speeds to be displayed adjacent to an ownship symbol on the ND;

The visualization assistance system is configured, with respect to the PFD, to: position, on HSI, widget representative of TTF and range ring symbol, the TTF widget including icon representative of TTF, call sign/flight ID for TTF, ground speed of TTF, numerical representation of altitude difference between TTF and ownship, numerical representation of the differential ground speed between the TTF and ownship and a differential ground speed symbol representative of a range of differential ground speeds to be displayed adjacent to an ownship symbol on the HSI; position, on the SVS, a selectable traffic symbol representative of traffic ahead of the ownship wherein the size of the traffic symbol is scaled based on proximity to ownship; highlight a traffic symbol on SVS that is representative of an aircraft that has been designated as a TTF; designate an aircraft as a TTF responsive to selection of a traffic symbol on SVS representative of the aircraft, wherein TTF is selectable from ND, SVS and HSI and threshold distance can be entered from ND, SVS or HSI; cause the display of a numerical representation of the differential ground speed between the TTF and ownship and a differential ground speed symbol representative of a range of differential ground speeds to be displayed either adjacent to an ownship symbol on the SVS or adjacent to existing groundspeed display on the SVS; estimate airspeed target using current airspeed, wind speed and direction, and current and differential groundspeed for achieving a suitable target speed to maintain the desired distance from TTF and cause estimated airspeed target to be displayed on SVS; cause estimated airspeed target to be displayed in airspeed indicator section on SVS; cause a vertical line from TTF symbol displayed on SVS to TTF symbol displayed on PFD to provide indication of the TTF range; and cause the state of the TFF symbol on SVS and the TTF symbol on the HSI to change when TTF no longer meets minimum CAVS criteria.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A visualization assistance system for providing visual cues to flight crew on multiple displays while following a proceeding aircraft during an approach using visual separation rules, the visualization assistance system comprising one or more processors configured by programming instructions on non-transient computer readable media, the visualization assistance system configured to:

position, on an SVS (synthetic vision system) display section of a primary flight display (PFD) or head-up display (HUD), one or more traffic icons wherein each is representative of a lead aircraft ahead of an ownship and wherein the size of each traffic icon is scaled based on proximity to the ownship;

designate a lead aircraft as traffic to follow (TTF) via selection of a first traffic icon representative of one lead aircraft displayed on a navigation display (ND) or via selection of a second traffic icon representative of the same lead aircraft displayed on the SVS, wherein selection of either the first traffic icon or the second traffic icon results in designation of the selected lead aircraft as TTF and results in both the first traffic icon and the second traffic icon being made to more visually stand out; and position, on an HSI (horizontal situation indicator) section of the PFD, a third TTF icon representative of the lead aircraft when a TTF has been designated.

2. The visualization assistance system of claim 1, wherein the third TTF icon includes a designation of the call sign or flight ID for the TTF, the ground speed of the TTF, and a numerical representation of an altitude difference between the TTF and the ownship.

3. The visualization assistance system of claim 1, further configured to:

cause a first range ring symbol along with a numerical representation of a flight crew selected threshold distance to be displayed on the ND adjacent the first range ring symbol, wherein the threshold distance is equal to a minimum flight crew selected separation distance between the TTF and the ownship, and wherein the distance between the first traffic icon, the first range ring symbol and an ownship symbol on the ND is proportional to the horizontal distance between the actual TTF, the threshold distance and the actual ownship; and cause a second range ring symbol along with a numerical representation of the flight crew selected threshold distance to be displayed on the HSI section of the PFD, wherein the distance between the third traffic icon, the second range ring symbol and an ownship symbol on the HSI is proportional to the horizontal distance between the actual TTF, the threshold distance and the actual ownship, and wherein selection of either the first traffic icon, the second traffic icon, or the third traffic icon allows for entry of the threshold distance from the ND, the SVS or the HSI.

4. The visualization assistance system of claim 1, further configured to systematically adjust the position of the first traffic icon relative to the first range ring symbol and the ownship symbol on the ND, and the position of the third traffic icon relative to the second range ring symbol and the ownship symbol on the HSI.

5. The visualization assistance system of claim 1, further configured to:
- cause to be displayed, adjacent to an ownship symbol on the ND, a numerical representation of the differential ground speed between the TTF and ownship and a differential ground speed symbol representative of a range of differential ground speeds; and
- cause to be displayed, on the PFD, a numerical representation of the differential ground speed between the TTF and the ownship and a differential ground speed symbol representative of a range of differential ground speeds.

6. The visualization assistance system of claim 5, configured to cause the numerical representation of the differential ground speed and the differential ground speed symbol to be displayed either adjacent to an ownship symbol on the SVS or adjacent to an existing groundspeed display on the SVS or HUD.

7. The visualization assistance system of claim 1, further configured to:
- estimate an airspeed target at which to fly to maintain a desired distance between the ownship and the TTF; and
- cause the estimated airspeed target to be displayed on the SVS or HUD.

8. The visualization assistance system of claim 7, configured to cause the estimated airspeed target to be displayed in an airspeed indicator section on the SVS or HUD.

9. The visualization assistance system of claim 7, configured to estimate the airspeed target using a current ownship airspeed, wind speed and direction, current ownship groundspeed, and differential groundspeed between the TTF and the ownship.

10. The visualization assistance system of claim 1, further configured to cause a vertical line from TTF symbol displayed on SVS to TTF symbol displayed on PFD to provide an indication of TTF range.

11. The visualization assistance system of claim 1, further configured to cause the state of the TFF symbol on SVS and the TTF symbol on the HSI to change when the TTF no longer meets minimum CAVS criteria.

12. A computer-implemented method in a trail aircraft for providing visual cues to flight crew on multiple displays while following a proceeding aircraft during an approach using visual separation rules, the method comprising:
- positioning, on an SVS (synthetic vision system) display section of a primary flight display (PFD) or head-up display (HUD), one or more traffic icons wherein each is representative of a lead aircraft ahead of an ownship and wherein the size of each traffic icon is scaled based on proximity to the ownship;
- designating a lead aircraft as traffic to follow (TTF) via selection of a first traffic icon representative of one lead aircraft displayed on a navigation display (ND) or via selection of a second traffic icon representative of the same lead aircraft displayed on the SVS, wherein selection of either the first traffic icon or the second traffic icon results in designation of the selected lead aircraft as TTF and results in both the first traffic icon and the second traffic icon being made to more visually stand out; and
- positioning, on an HSI (horizontal situation indicator) section of the PFD, a third TTF icon representative of the lead aircraft when a TTF has been designated.

13. The method of claim 12, wherein the third TTF icon includes a designation of the call sign or flight ID for the TTF, the ground speed of the TTF, and a numerical representation of an altitude difference between the TTF and the ownship.

14. The method of claim 12, further comprising:
- causing a first range ring symbol along with a numerical representation of a flight crew selected threshold distance to be displayed on the ND adjacent the first range ring symbol, wherein the threshold distance is equal to a minimum flight crew selected separation distance between the TTF and the ownship, and wherein the distance between the first traffic icon, the first range ring symbol and an ownship symbol on the ND is proportional to the horizontal distance between the actual TTF, the threshold distance and the actual ownship; and
- causing a second range ring symbol along with a numerical representation of the flight crew selected threshold distance to be displayed on the HSI section of the PFD, wherein the distance between the third traffic icon, the second range ring symbol and an ownship symbol on the HSI is proportional to the horizontal distance between the actual TTF, the threshold distance and the actual ownship, and wherein selection of either the first traffic icon, the second traffic icon, or the third traffic icon allows for entry of the threshold distance from the ND, the SVS or the HSI.

15. The method of claim 12, further comprising systematically adjusting the position of the first traffic icon relative to the first range ring symbol and the ownship symbol on the ND, and the position of the third traffic icon relative to the second range ring symbol and the ownship symbol on the HSI.

16. The method of claim 12, further comprising:
- causing to be displayed, adjacent to an ownship symbol on the ND, a numerical representation of the differential ground speed between the TTF and ownship and a differential ground speed symbol representative of a range of differential ground speeds; and
- causing to be displayed, on the SVS or HUD, a numerical representation of the differential ground speed between the TTF and the ownship and a differential ground speed symbol representative of a range of differential ground speeds.

17. The method of claim 12, further comprising:
- estimating an airspeed target at which to fly to maintain a desired distance between the ownship and the TTF; and
- causing the estimated airspeed target to be displayed in an airspeed indicator section on the SVS or HUD.

18. The method of claim 17, comprising estimating the airspeed target using a current ownship airspeed, wind speed and direction, current ownship groundspeed, and differential groundspeed between the TTF and the ownship.

19. The method of claim 12, further comprising causing the state of the TTF symbol on SVS and the TTF symbol on the HSI to change when the TTF no longer meets minimum CAVS criteria.

20. Non-transient computer readable media encoded with programming instructions that when executed by one or more processors in a trail aircraft causes the one or more processors to perform a method of providing visual cues to flight crew on multiple displays while the trail aircraft follows a proceeding aircraft during an approach using visual separation rules, the method comprising:
- positioning, on an SVS (synthetic vision system) display section of a primary flight display (PFD) or head-up display (HUD), one or more traffic icons wherein each is representative of a lead aircraft ahead of an ownship and wherein the size of each traffic icon is scaled based on proximity to the ownship;

designating a lead aircraft as traffic to follow (TTF) via selection of a first traffic icon representative of one lead aircraft displayed on a navigation display (ND) or via selection of a second traffic icon representative of the same lead aircraft displayed on the SVS, wherein selection of either the first traffic icon or the second traffic icon results in designation of the selected lead aircraft as TTF and results in both the first traffic icon and the second traffic icon being made to more visually stand out; and positioning, on an HSI (horizontal situation indicator) section of the PFD, a third TTF icon representative of the lead aircraft when a TTF has been designated.

\* \* \* \* \*